US006076391A

United States Patent [19]
Broch

[11] Patent Number: 6,076,391
[45] Date of Patent: Jun. 20, 2000

[54] METHOD AND APPARATUS FOR CHECKING A SENSOR

[75] Inventor: Walter Broch, Wiedenzhausen, Germany

[73] Assignee: Knorr-Bremse Electronic GmbH, Munich, Germany

[21] Appl. No.: 09/125,680

[22] PCT Filed: Dec. 12, 1996

[86] PCT No.: PCT/DE96/02419

§ 371 Date: Aug. 24, 1998

§ 102(e) Date: Aug. 24, 1998

[87] PCT Pub. No.: WO97/31243

PCT Pub. Date: Aug. 28, 1997

[30] Foreign Application Priority Data

Feb. 23, 1996 [DE] Germany ........................... 196 06 826

[51] Int. Cl.[7] ........................................ G01L 27/00

[52] U.S. Cl. ........................................ 73/1.15; 13/1.57

[58] Field of Search ........................................ 73/1.08, 1.15, 73/1.57, 1.59, 1.63, 1.64, 1.66; 324/202

[56] References Cited

U.S. PATENT DOCUMENTS 4,147,431 4/1979 Mann .
4,896,525 1/1990 Breimesser ................................ 73/1.88

FOREIGN PATENT DOCUMENTS 0 423 622 4/1991 European Pat. Off. .
43 41 118 6/1995 Germany .

*Primary Examiner*—Robert Raevis
*Attorney, Agent, or Firm*—Evenson, McKeown, Edwards & Lenahan, PLLC

[57] ABSTRACT

A method and apparatus for checking a sensor which generates an electrical measuring signal on the basis of a non-electrical physical value. A test value transmitter is used to generate a non-electrical physical value (which is the same type as the physical value to be measured by the sensor) when an electrical checking signal is applied. The electrical checking signal and the electrical test signal are compared with each other and thus simulate a measuring operation of the sensor. The sensor is effectively checked, on the basis of its own physical measuring operation over the sensors entire measuring range.

23 Claims, 5 Drawing Sheets

METHOD AND APPARATUS FOR CHECKING A SENSOR

BACKGROUND AND SUMMARY OF THE INVENTION

The invention relates to a method and apparatus for checking a sensor. Specifically, the present invention relates to a method of checking a sensor which generates an electrical measuring signal on the basis of a non-electrical physical value.

A known method of checking sensors consists of applying check signals or an electrical check voltage to the sensor and then studying the pattern of the check signal or the sensor output signal generated during the check procedure to determine whether it is within predetermined limits. The check signal and the physical parameter measured by the sensor bear no direct relationship to one another so that normally only errors such as short circuits, line breaks, or the like can be detected. The check signal and the measured parameter, however, do not determine whether the sensor is operating reliably over its entire measurement range. Since a check signal is applied to the electrical measuring circuit, occasionally the test signal generated by application of the check signal (sensor output signal) cannot be distinguished from a useful signal or a defective useful signals.

It is also known that a sensor can be checked by interrogating the sensor during known states of the object being measured (or during the shutdown of a component whose rotational speed is to be measured), and comparing its output signal with the known value. Similarly, a reference object with precisely known properties is measured by the sensor for calibrating or gauging a sensor. In both cases the sensor can only be checked during precisely known states of the measured object or a comparison standard, but not during normal use of the measured object (for example, if the sensor is installed in a device).

It is an object of the present invention to provide a method and apparatus for checking a sensor which permits reliable and unambiguous checking of the sensor over its entire measurement range.

This and other objects and advantages are achieved by the apparatus according to the present invention, in which a sensor, via a test value transmitter, is actively subjected to the physical parameter to be measured. The sensor and the test value transmitter therefore operate according to the same principle. The sensor and the test value transmitter also generate an electrical signal under the influence of a non-electrical physical parameter and conversely generates the same non-electrical physical parameter when an electrical signal is applied. Non-electrical parameters are generally considered to be magnetic, mechanical, thermal, optical, and chemical parameters.

The test value transmitter uses an electrical check signal to generate the non-electrical physical parameter that acts on the checked sensor. The sensor then generates an electrical output signal referred to hereinbelow as the check signal. The check signal that excites the test value transmitter, along with the test signal generated during a checking procedure by the sensor, bear a direct correlation to one another and depend linearly upon one another in converters with linear characteristics. The proportionality factor of the linear dependence depends on the efficiency and degree of coupling between the sensor and the test value transmitter with regard to the non-electrical physical parameter and is used as the known constant in the above configuration. If the check signal and test signal correspond in light of this factor, this is a reliable indication that the sensor is functioning reliably, since the sensor is checked using its own measuring principle.

In an embodiment of the invention, the sensor and the test value transmitter are integrated into one structural unit, so that the sensor (even if it is built into a device), can be checked at any desired time. It is also especially advantageous that the electrical measuring circuit of the sensor and the electrical check circuit of the test value transmitter can be completely separate from one another, so that these circuits operate without any feedback. For example, an electrical short in the sensor has no effect on the electrical check circuit and vice versa, so that the danger that would otherwise exist is eliminated (namely that a defective electrical circuit could destroy structural elements in the other electrical circuits).

In preferred embodiments of the invention, the sensor and the test value transmitter are electromagnetic converters (coupled electromagnetically with one another), induction coils, Hall probes, piezoelectric transducers (forcibly coupled with one another) or thermocouples (coupled thermally with one another).

In the case of the electromagnetic and piezoelectric converters, according to an object of the invention, it is also possible to superimpose the testing procedure on the actual measurement procedure of the sensor, (i.e., to check the sensor during its measuring operation). This can be accomplished, for example, if the physical parameter to be measured and the physical parameter generated by the test value transmitter differ in frequency so that the output signal from the sensor contains the actual measurement or useful signal and the test signal. These two signals are separable from one another by frequency filtration.

Another important advantage of the invention is that the sensor can be checked over its entire measurement range with the check signal, and hence the physical parameter generated by the test value transmitter can scan the entire measurement range of a sensor during testing.

The invention will now be described in greater detail with reference to the drawings.

DETAILED DESCRIPTION OF THE INVENTION

Figure 1:
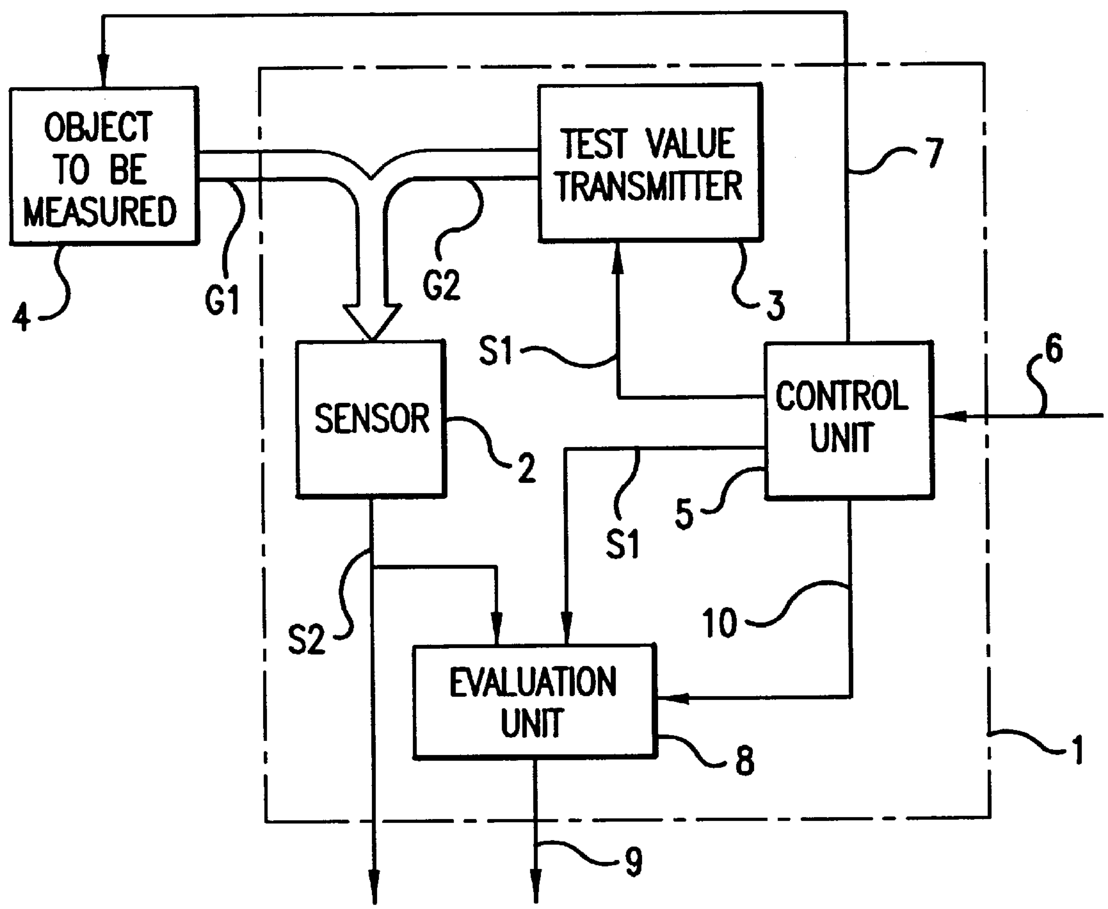
FIG. 1 is a schematic diagram of a device for checking a sensor.

FIG. 1 schematically shows, a device 1 for checking a sensor 2 via a test value transmitter 3. During measurement, a first non-electrical physical parameter G1 generated by an object 4 being measured acts on sensor 2, the parameter G1 is converted by sensor 2 into an electrical measurement signal.

When used to check sensor 2, a test value transmitter 3 generates a second non-electrical physical parameter G2 of the same type as the first non-electrical physical parameter G1 (where test value transmitter 3 and sensor 2 are coupled together such that the physical parameter G2 generated by test value transmitter 3 acts on sensor 2). Sensor 2 then generates an electrical test signal S2 that is proportional to the physical parameter G2 or, depending on the curve or transmission function of sensor 2, depends upon parameter G2 in a known manner.

Test value transmitter 3 is controlled by a control unit 5 with a check signal S1 that is used as the basis for producing physical parameter G2. Test value transmitter 3 and sensor 2 thus basically operate according to the same operating principle (electromagnetically or piezoelectrically, for example), except that in this case they are used in a reversed operating mode. While the sensor converts non-electrical physical parameter G1 into an electrical signal S2, test value transmitter 3 converts electrical signal S1 into non-electrical physical parameter G2.

It is especially advantageous if sensor 2 and test value transmitter 3 operate in accordance with a reversible principle, in other words they can be operated in both directions, i.e., they can generate a non-electrical physical parameter from an electrical parameter and they can generate an electrical parameter from a non-electrical physical parameter. Here, the sensor and test value transmitter can be assembled from identical components so that they have identical curves. As a result, there is a linear relationship between check signal S1 and test signal S2 that is determined only by the efficiency of the test value transmitter, the sensor and the degree of coupling. By suitably dimensioning test value transmitter 3 and sensor 2, these influences of the efficiency and coupling factor can be compensated in a reliably operating sensor so that test signal S2 is exactly equal to check signal S1. These two signals are fed to an evaluation unit 8 that compares these signals and then outputs an error signal on a line 9, if the absolute value of the difference between the two signals exceeds a fixed threshold value.

In the event that (cf. the influences of efficiency and coupling factor discussed above) signals S1 and S2 are not identical when sensor 2 is not defective (as a result of the system), evaluation unit 8 can still apply a correction value to one of the two signals S1 or S2 (for example, multiplication by a constant factor or addition of a constant value) before the two signals are compared. It is also possible for control unit 5 to transmit a correspondingly corrected signal to evaluation unit 8.

Control unit 5 triggers the checking process in certain states of measured object 4, or in a wheel rpm sensor of a motor vehicle when the ignition is switched on. A corresponding activation signal for control unit 5 is supplied by an electrical line 6. It is also possible to perform the check when certain states of measured object 4 are detected by sensor 2. In the example of a wheel rpm sensor in motor vehicles, the check can always be performed when sensor 2 reports that the wheel is at rest. In cases of an electrically controllable measured object 4, generation of physical parameter G1 by measured object 4 (during checking of sensor 2) can be suppressed by control unit 5 through an electrical lead 7. Finally, as mentioned above, it is also possible in some applications to check the sensor during measurement operations. The evaluation unit then contains controllable frequency filters for signals S1 and S2, for example, with these frequency filters being adjusted through a lead 10 by the control unit.

Figure 2:
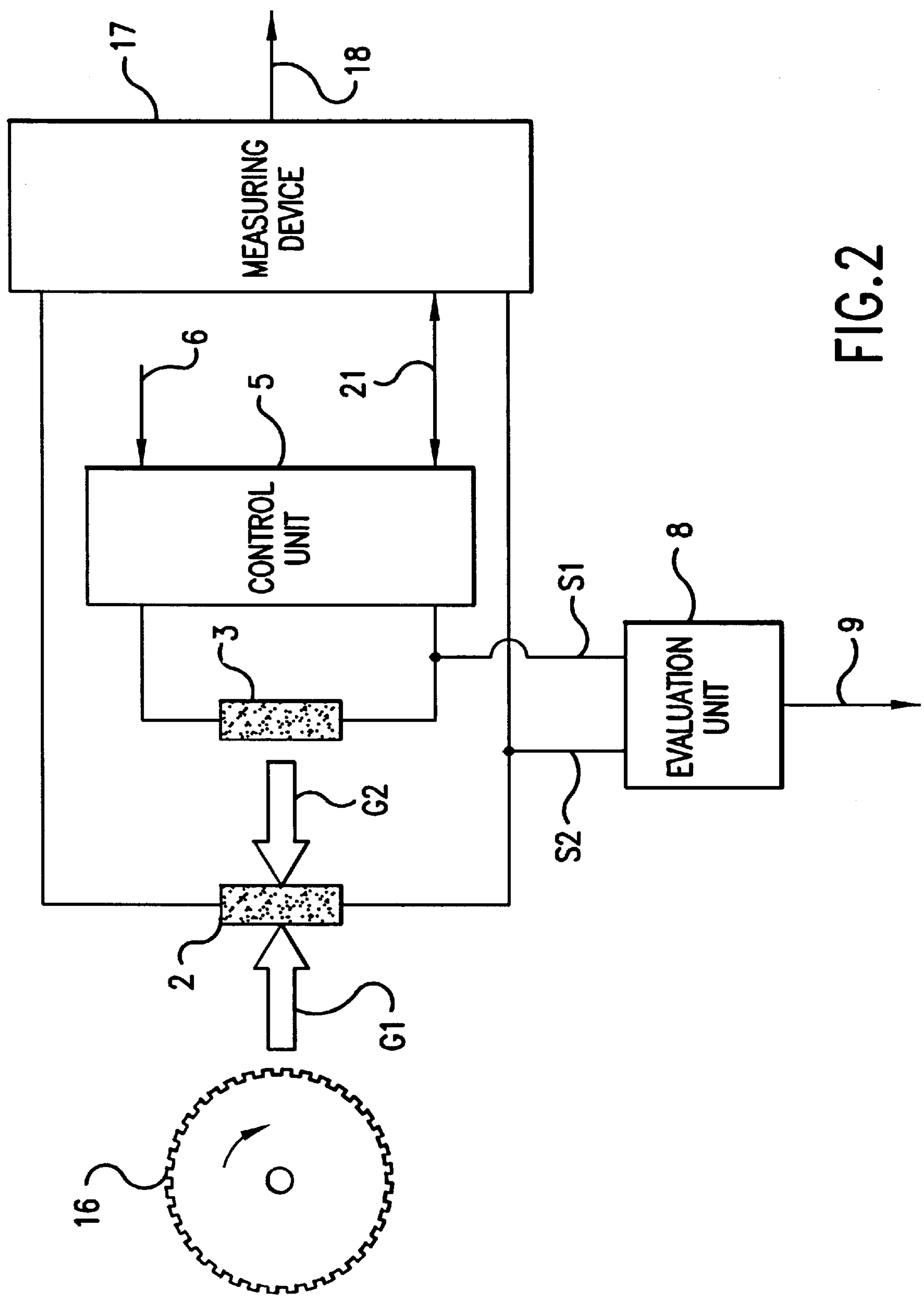
FIG. 2 is an embodiment with an electromagnetic sensor and an electromagnetic test value transmitter according to the invention.

FIG. 2 shows an embodiment of the invention in which sensor 2 and test value transmitter 3 are induction coils that are electromagnetically coupled with one another. For example, the induction coils can even be wound on a common core so that sensor 2 and measured value sensor 3 are integrated into one unit. The two non-electrical physical parameters G1 and G2 are then both magnetic fields.

In this embodiment, sensor 2 is used as a wheel rpm sensor that converts electromagnetic oscillations modulated by a pole wheel 16 (in accordance with its rotational speed) into electrical voltage pulses that are evaluated by a measuring device 17. An analog or digital signal that corresponds to the rpm is then generated on a line 18 and evaluated in a manner of no further interest, for example for ABS control, drive slip regulation as a tacho signal, etc. While the sensor is being checked, control unit 5 subjects the induction coil of test value transmitter 3 to an electrical voltage that is converted by test value transmitter 3 into non-electrical physical parameter G2 (in this case a magnetic field), which induces an electrical voltage in sensor 2 that represents test signal S2. The excitation voltage supplied to test value transmitter 3, in other words check signal S1, is then compared in the evaluation unit 8 with test signal S2, and an error signal is output on line 9 (when the two signals S1 and S2 differ from one another to a predetermined extent).

Evaluation unit 17 and control unit 5 are connected with one another by an electrical lead 21. In this way, for example, whenever pole wheel 16 is at rest (i.e., when the measurement signal of sensor 2 is absent), a checking process can be triggered. A checking process can also be triggered through line 6 during other operating states, for example, when the ignition is switched on. Since (in this case) the sensor output signal has a certain frequency (in both measurement operation and in check operation), it is possible to superimpose both operations onto one another, with the frequency of check signal S1 being displaced by a sufficient amount from the useful signal.

The frequency of the useful signal can be sent to control unit 5 through line 21, and the frequency of the check signal then determined. Line 6 can also be used to prevent a checking process from being triggered during certain operating states of the vehicle, for example during a braking process. Finally, it is also possible to report to evaluation unit 7 via line 21 that a check is currently taking place so that the output of the actual measurement signal on line 18 is suppressed for this period of time.

Figure 3:
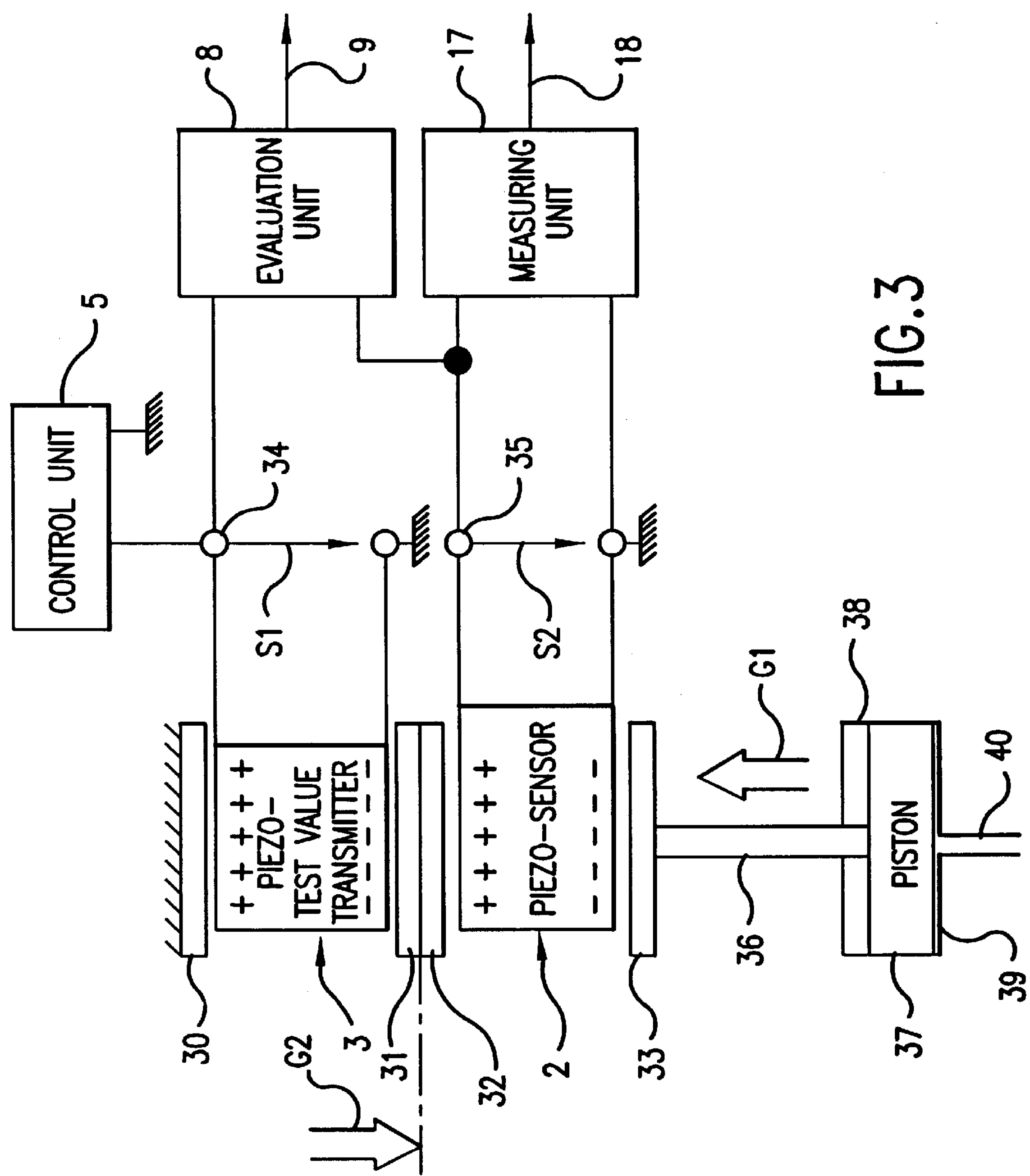
FIG. 3 is an embodiment with a piezoelectric force/stress converter as a sensor and test value transmitter according to the invention.

FIG. 3 shows one embodiment of the invention in which sensor 2 and test value transmitter 3 are piezoelectric force/voltage converters. The two non-electrical physical parameters G1 and G2 are both mechanical forces while check signal S1 and test signal S2 are electrical voltages.

Test value transmitter 3 contains a piezo crystal located between two plates 30 and 31, and sensor 2 likewise contains a piezo crystal located between two plates 32 and 33. The sensor and the test value transmitter are coupled with one another forcewise, with adjacent plates 31 and 32 abutting one another. Plate 30 is supported on a counterbearing and plate 33 is the part on which force G1 to be measured acts. FIG. 3 further shows an arrangement in which the sensor is used as a pressure sensor. For this purpose, a piston rod 36 is coupled with plate 32 and with a piston 37. Piston 37 is displaceably guided in a cylinder 38 (with cylinder 38 having a pressure medium opening 40), through which the pressure of a gas or fluid to be measured acts on piston 37. In the zero pressure state, piston 37 is supported against a wall 39 of the cylinder and can thus accept forces acting against force G1 (with force G2 generated by test value transmitter 3 being directed opposite to force G1). To check the sensor, control unit 5 supplies check voltage S1 to terminal 34 of test value transmitter 3, causing test value transmitter to generate force G2 that acts from plate 31 on plate 32 and hence on sensor 2. The latter, depending on the magnitude of force G2, generates test voltage S2 which is tapped off at terminals 35 and can be supplied to evaluation unit 8 (where it is compared with check voltage S1).

Figure 4:
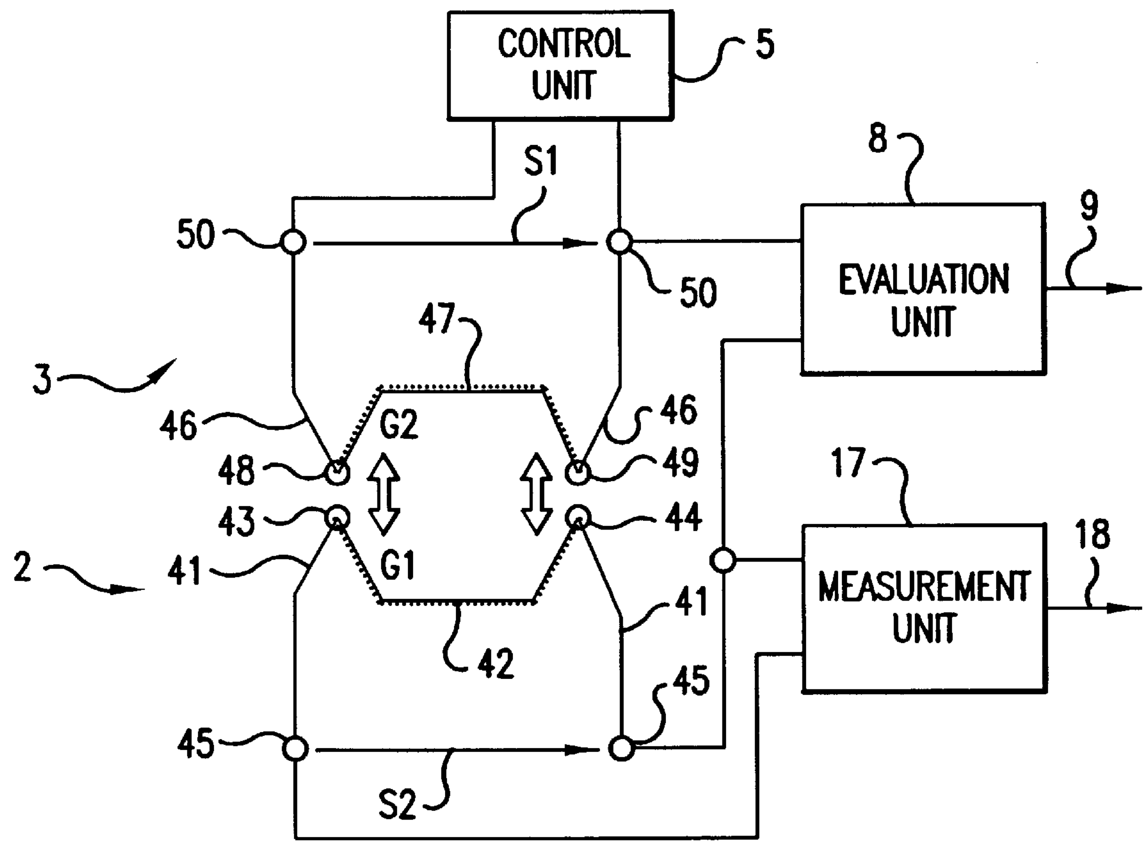
FIG. 4 is an embodiment with thermocouples as the sensor and test value transmitter according to the invention.

FIG. 4 shows another embodiment of the invention in which sensor 2 and test value transmitter 3 are thermocouplers thermally coupled with one another. The two non-electrical physical parameters G1 and G2 are then thermal energies or temperatures, while check signal S1 and test signal S2 are electrical voltages once again. Sensor 2, as is conventional in thermocouplers, consists of electrical conductors 41 and 42 made of different materials and connected with one another at two connecting points 43 and 44. If these two connecting points 43 and 44 are at different temperatures, the thermocoupler generates a so-called thermovoltage. Conversely, when an electrical voltage is applied to terminals 45, such a thermocoupler will accept different temperatures at connecting points 43 and 44.

Test value transmitter 3 is constructed in similar fashion from electrical conductors 46 and 47 made of different materials, which in turn are connected with one another at connecting points 48 and 49. These connecting points 48 and 49 of test value transmitter 3 are thermally coupled with connecting points 43 and 44 of sensor 2. When control unit 5 applies a check voltage S1 to terminals 50 of test value transmitter 3, connecting points 48 and 49 exhibit a temperature differential. This temperature differential is detected by connecting points 43 and 44 and converted into test voltage S2. Check voltage S1 and test voltage S2 are then resupplied to evaluation unit 8. Here again, sensor 2 is checked for its function by a test value transmitter using the same physical principle.

During normal measurement, in which the test value transmitter is connected so that it is ineffective, the thermal voltage is applied to terminals 45 of measurement unit 17 and output as a measured value for line 18.

Figure 5:
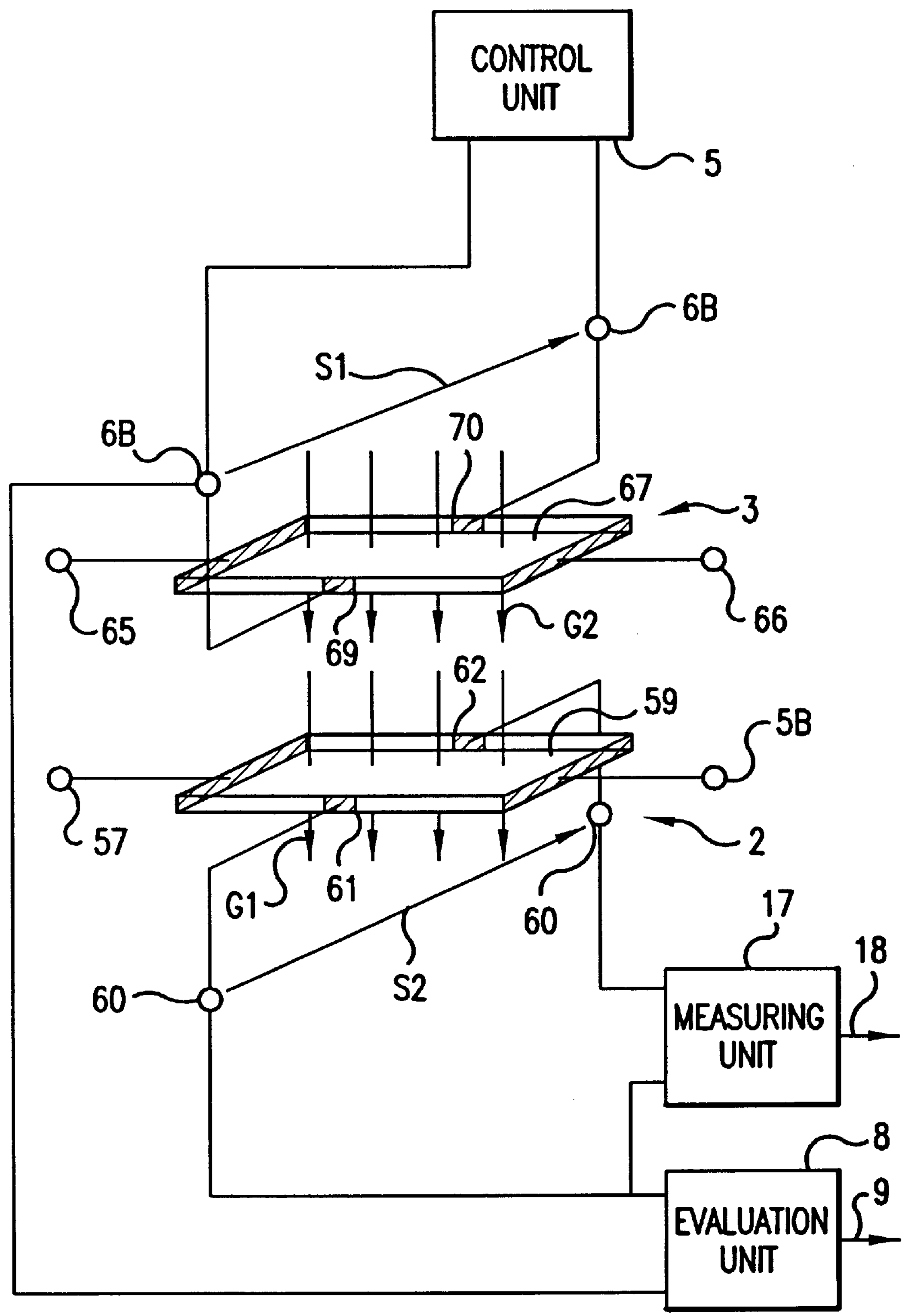
FIG. 5 is an embodiment with Hall probes as the sensor and test value transmitter according to the invention.

FIG. 5 shows another embodiment of the present invention in which sensor 2 and test value transmitter 3 are Hall probes. The two non-electrical physical parameters G1 and G2 are both magnetic fields. Check signal S1 and test signal S2 are once again electrical voltages. The two Hall probes are once again magnetically coupled together. In other words they are arranged in parallel with one another so that the magnetic field of one Hall probe penetrates the other Hall probe and vice versa.

Sensor 2 consists of a PC board 59 through which current flows, with terminals 57 and 58 provided at the opposite ends of said board to apply this current. If board 59 is traversed by a magnetic field G1, a voltage is created on the faces of the plate that are parallel to the flow direction, and this voltage can be tapped off through contacts 61 and 62. This voltage is proportional to the strength of the magnetic field. Terminals 60 of the sensor that are connected to contacts 61 and 62 are in turn connected with measuring unit 17.

Test value transmitter 3 is designed in the same fashion and has a PC board 67, terminals 65 and 66 on two opposite sides for applying the current, and contacts 69 and 70 on the other faces that are connected with terminals 68 for application of check voltage S1 from control unit 5. If board 67 is traversed by a current when check voltage S1 is applied, a magnetic field G2 is produced that also flows through sensor 2 because of the arrangement of test value transmitter 3 and sensor 2, and in turn produces check voltage S2 in sensor 2. Here again, check voltage S1 and check voltage S2 are compared with one another in evaluation unit 8. In this embodiment, as in the embodiment in FIG. 2, it is possible to superimpose the measurement signal and check signal on one another so that, as before, checking can be performed during measurements by sensor 2.

What is claimed is:

1. An apparatus for checking a sensor of the type that generates an electrical measurement signal on the basis of the action of a non-electrical physical parameter, comprising:

a test value transmitter which receives an electrical check signal and generates a non-electrical physical parameter of a same type;

a sensor for measuring the non-electrical physical parameter and generating a test signal; and an evaluation unit for receiving and evaluating the check signal and the test signal;

wherein when the electrical check signal is applied, the test value transmitter generates the non-electrical physical parameter which acts on the sensor, so that the sensor generates the test signal, and wherein the check signal and the test signal are supplied to the evaluation unit for comparison with one another.

2. The apparatus according to claim 1, wherein the sensor and the test value transmitter are integrated into a single structural unit.

3. The apparatus according to claim 2, wherein the test value transmitter is electrically controlled independently from the sensor.

4. The apparatus according to claim 2, wherein a control unit is provided that generates the check signal at predetermined intervals and triggers a testing process.

5. The apparatus according to claim 2, wherein the evaluation unit corrects the check signal or the test signal prior to the comparison in accordance with a predetermined function, with the predetermined function taking into account an efficiency of the sensor, test value transmitter and their coupling.

6. The apparatus according to claim 1, wherein the test value transmitter is electrically controlled independently from the sensor.

7. The apparatus according to claim 6, wherein a control unit is provided that generates the check signal at predetermined intervals and triggers a testing process.

8. The apparatus according to claim 6, wherein the evaluation unit corrects the check signal or the test signal prior to the comparison in accordance with a predetermined function, with the predetermined function taking into account an efficiency of the sensor, test value transmitter and their coupling.

9. The apparatus according to claim 1, wherein a control unit is provided that generates the check signal at predetermined intervals and triggers a testing process.

10. The apparatus according to claim 9, wherein the control unit repeats the test process cyclically.

11. The apparatus according to claim 1, wherein the evaluation unit corrects the check signal or the test signal prior to the comparison in accordance with a predetermined function, with the predetermined function taking into account an efficiency of the sensor, test value transmitter and their coupling.

12. The apparatus according to claim 1, wherein a control unit changes the check signal during a checking process so that the non-electrical physical parameter is changed and a measurement range of the sensor is scanned.

13. The apparatus according to claim 1, wherein the sensor and the test value transmitter are induction coils electromagnetically coupled with one another.

14. The apparatus according to one of claim 1, wherein the sensor and the test value transmitter are piezoelectric force/voltage converters that are coupled forcewise with one another.

15. The apparatus according to one of claim 1, wherein the sensor and the test value transmitter are thermocouplers thermally coupled with one another.

16. The apparatus according to one of claim 1, wherein the sensor and the test value transmitter are Hall probes electromagnetically coupled with one another.

17. A method for checking a sensor of the type which generates electrical measurement signals on the basis of the influence of non-electrical physical parameters, the method comprising the acts of:

applying a check signal to a test value transmitter;

generating a non-electrical physical parameter with the test value transmitter said non-electrical physical parameter being of a same type as that normally measured by the sensor;

coupling the test value transmitter and the sensor based on the non-electrical physical parameter; and generating test signals with the sensor;

comparing, on the basis of the non-electrical physical parameter acting on the sensor, the electrical check signal and the test signals.

18. The method according to claim 17, further comprising the act of:

conducting a checking process prior to a measurement operation of the sensor.

19. The method according to claim 18, further comprising the act of:

only performing the checking process when the physical parameter to be measured by the sensor has a predetermined value.

20. The method according to claim 18, further comprising the act of:

varying the electrical check signal during a checking process such that the entire measurement range of the sensor is scanned.

21. The method according to claim 17, further comprising the act of:

only performing the checking process when the physical parameter to be measured by the sensor has a predetermined value.

22. The method according to claim 17, further comprising the act of:

varying the electrical check signal during a checking process such that the entire measurement range of the sensor is scanned.

23. The method according to claim 17, further comprising the act of:

correcting at least one of the electrical check signal and the electrical test signal in accordance with a predetermined function prior to the comparison act.

* * * * *